US012679926B2

(12) United States Patent
Park et al.

(10) Patent No.: US 12,679,926 B2
(45) Date of Patent: Jul. 14, 2026

(54) MONOMER COMPOSITION FOR SYNTHESIZING RECYCLED PLASTIC, PREPARATION METHOD THEREOF, AND RECYCLED PLASTIC, MOLDED PRODUCT, PLASTICIZER COMPOSITION USING THE SAME

(71) Applicant: LG CHEM, LTD., Seoul (KR)

(72) Inventors: Tae Seung Park, Daejeon (KR); Jeongnam Kim, Daejeon (KR); Jihwan Hwang, Daejeon (KR); Mooho Hong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 643 days.

(21) Appl. No.: 18/029,826

(22) PCT Filed: Jul. 14, 2022

(86) PCT No.: PCT/KR2022/010306
§ 371 (c)(1),
(2) Date: Mar. 31, 2023

(87) PCT Pub. No.: WO2023/003280
PCT Pub. Date: Jan. 26, 2023

(65) Prior Publication Data
US 2023/0383052 A1     Nov. 30, 2023

(30) Foreign Application Priority Data

| Jul. 19, 2021 | (KR) | 10-2021-0094470 |
| Jul. 19, 2021 | (KR) | 10-2021-0094471 |
| Jul. 19, 2021 | (KR) | 10-2021-0094472 |
| Jul. 19, 2021 | (KR) | 10-2021-0094473 |

(51) Int. Cl.
*C08G 63/183* (2006.01)
*C08J 11/08* (2006.01)
*C08J 11/24* (2006.01)

(52) U.S. Cl.
CPC ............. *C08G 63/183* (2013.01); *C08J 11/08* (2013.01); *C08J 11/24* (2013.01); *C08J 2367/02* (2013.01)

(58) Field of Classification Search
USPC ...................................................... 521/48.5
See application file for complete search history.

(56) References Cited

U.S. PATENT DOCUMENTS

| 3,592,847 A | 7/1971 | Gallivan, Jr. et al. |
| 3,646,124 A | 2/1972 | Keith et al. |
| 3,799,976 A | 3/1974 | Nienburg et al. |
| 5,095,145 A | 3/1992 | Rosen |
| 5,210,292 A | 5/1993 | Park et al. |
| 5,426,217 A | 6/1995 | Royall et al. |
| 5,504,121 A | 4/1996 | West |
| 5,554,657 A | 9/1996 | Brownscombe et al. |
| 5,602,187 A | 2/1997 | West |
| 5,840,968 A | 11/1998 | Lee et al. |
| 6,013,835 A | 1/2000 | Lee et al. |
| 6,031,128 A | 2/2000 | Roh et al. |
| 6,075,163 A | 6/2000 | Roh et al. |
| 6,580,005 B1 | 6/2003 | Yazaki et al. |
| 9,550,713 B1 | 1/2017 | Essaddam |
| 10,604,634 B1 | 3/2020 | Lai et al. |
| 10,683,253 B2 | 6/2020 | Nakamura et al. |
| 2002/0061933 A1 | 5/2002 | Kawamura et al. |
| 2003/0225299 A1 | 12/2003 | Yazaki et al. |
| 2005/0004390 A1 | 1/2005 | Nakao et al. |
| 2005/0203277 A1 | 9/2005 | Kim |
| 2005/0228195 A1 | 10/2005 | Wytcherley et al. |
| 2007/0219339 A1 | 9/2007 | Fregoso-Infante et al. |
| 2007/0299150 A1 | 12/2007 | Nakao et al. |
| 2009/0171113 A1 | 7/2009 | Anderson et al. |
| 2009/0287017 A1 | 11/2009 | Al Ghatta et al. |
| 2009/0318579 A1 | 12/2009 | Ikenaga |
| 2017/0008826 A1 | 1/2017 | Essaddam |
| 2017/0152203 A1 | 6/2017 | Essaddam |
| 2018/0291246 A1 | 10/2018 | Vasconcelos et al. |
| 2018/0362440 A1 | 12/2018 | Liao et al. |
| 2018/0370894 A1 | 12/2018 | Essaddam |
| 2019/0218362 A1 | 7/2019 | Barla et al. |
| 2019/0233361 A1 | 8/2019 | Nakamura et al. |
| 2021/0017353 A1 | 1/2021 | Sramek et al. |
| 2021/0253823 A1 | 8/2021 | Eichert et al. |
| 2024/0327603 A1 | 10/2024 | Barla et al. |

FOREIGN PATENT DOCUMENTS

| AU | 2019206607 A1 | 7/2020 |
| CN | 1209799 A | 3/1999 |
| CN | 1314878 A | 9/2001 |
| CN | 1563159 A | 1/2005 |
| CN | 102234226 A | 11/2011 |
| CN | 102250449 A | 11/2011 |
| CN | 105384621 A | 3/2016 |
| CN | 105646198 A | 6/2016 |
| CN | 108276274 A | 7/2018 |
| CN | 111334238 A | 6/2020 |
| CZ | 2018120 A3 | 4/2019 |
| EP | 1030829 B1 | 7/2006 |
| JP | 1993-255182 A | 10/1993 |
| JP | H05-255182 A | 10/1993 |
| JP | H06157402 A | 6/1994 |
| JP | H08020664 A | 1/1996 |

(Continued)

OTHER PUBLICATIONS

KR-100630847-B1 Machine Translation (Year: 2006).*

(Continued)

*Primary Examiner* — Terressa Boykin

(74) *Attorney, Agent, or Firm* — Bryan Cave Leighton Paisner LLP

(57) ABSTRACT

The present disclosure relates to a monomer composition for synthesizing recycled plastic that can secure terephthalic acid with low moisture content and increased particle size while recovering from a (co)polymer synthesized from monomers containing terephthalic acid, a method for preparing the same, and a recycled plastic, molded product, and plasticizer composition using the same.

19 Claims, No Drawings

(56)                References Cited

FOREIGN PATENT DOCUMENTS

| JP | H08193048 | A | 7/1996 | | |
| JP | H08208561 | A | 8/1996 | | |
| JP | 1996-325407 | A | 12/1996 | | |
| JP | 1999-502870 | A | 3/1999 | | |
| JP | H11-502868 | A | 3/1999 | | |
| JP | H11-502870 | A | 3/1999 | | |
| JP | 1999-302208 | A | 11/1999 | | |
| JP | 3069917 | B2 | 7/2000 | | |
| JP | 2001-114884 | A | 4/2001 | | |
| JP | 2001-151709 | A | 6/2001 | | |
| JP | 2002-086448 | A | 3/2002 | | |
| JP | 2002-155020 | A | 5/2002 | | |
| JP | 2002-155133 | A | 5/2002 | | |
| JP | 2002524390 | A | 8/2002 | | |
| JP | 2003-081912 | A | 3/2003 | | |
| JP | 2003-081914 | A | 3/2003 | | |
| JP | 2003510247 | A | 3/2003 | | |
| JP | 2003-128600 | A | 5/2003 | | |
| JP | 2003160652 | A | * | 6/2003 | |
| JP | 2003300916 | A | 10/2003 | | |
| JP | 2004-323411 | A | 11/2004 | | |
| JP | 2005-014279 | A | 1/2005 | | |
| JP | 3808672 | B2 | 8/2006 | | |
| JP | 2007532569 | A | 11/2007 | | |
| JP | 2007332361 | A | 12/2007 | | |
| JP | 2005023054 | A | 1/2008 | | |
| JP | 4381600 | B2 | 12/2009 | | |
| JP | 4531855 | B2 | 8/2010 | | |
| JP | 2014-080594 | A | 5/2014 | | |
| JP | 2015-172113 | A | 10/2015 | | |
| JP | 2017537185 | A | 12/2017 | | |
| JP | 2018-522107 | A | 8/2018 | | |
| JP | 2019210429 | A | 12/2019 | | |
| JP | 2021-073332 | A | 5/2021 | | |
| KR | 10-1991-0007859 | A | 5/1991 | | |
| KR | 19990003301 | A | 1/1999 | | |
| KR | 10-0175472 | B | 4/1999 | | |
| KR | 10-0224466 | B1 | † | 7/1999 | |
| KR | 10-0271405 | B1 | 11/2000 | | |
| KR | 10-2002-0078366 | A | 10/2002 | | |
| KR | 10-2005-0049566 | A | 5/2005 | | |
| KR | 10-0603723 | B1 | 7/2006 | | |
| KR | 100630847 | B1 | * | 10/2006 | .............. C08J 11/10 |
| KR | 10-2006-0127925 | A | 12/2006 | | |
| KR | 10-0866819 | B1 | 11/2008 | | |
| KR | 10-2010-0081641 | A | 7/2010 | | |
| KR | 10-2011-0057569 | A | 6/2011 | | |
| KR | 10-2013-0042742 | A | 4/2013 | | |
| KR | 20130042742 | A | * | 4/2013 | .............. C07C 69/82 |
| KR | 10-2013-0054046 | A | 5/2013 | | |
| KR | 10-2013-0130877 | A | 12/2013 | | |
| KR | 10-2017-0066668 | A | 6/2017 | | |
| KR | 10-2017-0103773 | A | 9/2017 | | |
| KR | 10-2018-0027539 | A | 3/2018 | | |
| KR | 10-1888612 | B1 | 8/2018 | | |
| KR | 10-1964361 | B1 | 4/2019 | | |
| KR | 10-2020-0035866 | A | 4/2020 | | |
| KR | 10-2020-0061948 | A | 6/2020 | | |
| KR | 10-2020-0142381 | A | 12/2020 | | |
| KR | 2011-0057569 | A | † | 4/2021 | |
| KR | 10-2023-0013561 | A | 1/2023 | | |
| NO | 03-051956 | A1 | 6/2003 | | |
| NO | 2020-053051 | A1 | 3/2020 | | |
| RU | 2214391 | C2 | 10/2003 | | |
| RU | 2616299 | C1 | 4/2017 | | |
| WO | 1999-062857 | A1 | 12/1999 | | |
| WO | 2006039872 | A1 | 4/2006 | | |
| WO | 2007-148353 | A1 | 12/2007 | | |
| WO | 2013-014650 | A1 | 1/2013 | | |
| WO | 2013-025186 | A1 | 2/2013 | | |
| WO | 2018-051775 | A1 | 3/2018 | | |

OTHER PUBLICATIONS

KR-20130042742-A Machine Translation (Year: 2013).*
JP-2003160652-A Machine Translation (Year: 2003).*
High Purity 99.9% Purified Terephthalic Acid (PTA) CAS 100-21-0-China Pure Terephthalic Acid and 100-21-0, Jan. 1, 1998, pp. 1-12.
Raheem et al., "Current developments in chemical recycling of post-consumer polyethylene terephthalate wastes for new materials production: A review", Journal of Cleaner Production, vol. 225, Jul. 1, 2019, pp. 1052-1064.
Thavornsetawat, et al., "Synthesis of a Plasticizer for PVC from Terephthalic Acid Based on the Chemical Recycling of Post-consumer PET Bottles", Journal of Scientific Research, Chulalongkorn University, Faculty of Science, Chulalongkorn University, Bangkok, TH, vol. 27, No. 1, Jan. 1, 2002, pp. 1-8.
Extended European Search Report for EP Application No. 22846147.1 dated Mar. 12, 2025.
Extended European Search Report for EP Application No. 22846148.1 dated Mar. 12, 2025.
Extended European Search Report for EP Application No. 22846149.7 dated Mar. 12, 2025.
Wu et al. "Recovery of Terephthalic Acid from Alkali Reduction Wastewater by Cooling Crystallization," Chem. Eng. Technol. 2011, 34, No. 10, 1614-1618.
National Standard of the People's Republic of China, No. GB/T 32685-2016 edition, China National Standardization Administration Committee, China Standards Press, publication date: Jan. 1, 2017.

* cited by examiner
† cited by third party

MONOMER COMPOSITION FOR SYNTHESIZING RECYCLED PLASTIC, PREPARATION METHOD THEREOF, AND RECYCLED PLASTIC, MOLDED PRODUCT, PLASTICIZER COMPOSITION USING THE SAME

CROSS-REFERENCE TO RELATED APPLICATION(S)

This application is a National Phase entry pursuant to 35 U.S.C. § 371 of International Application No. PCT/KR2022/010306, filed on Jul. 14, 2022, and claims priority to and the benefit of Korean Patent Application No. 10-2021-0094470, filed on Jul. 19, 2021, Korean Patent Application No. 10-2021-0094471, filed on Jul. 19, 2021, Korean Patent Application No. 10-2021-0094472, filed on Jul. 19, 2021 and Korean Patent Application No. 10-2021-0094473, filed on Jul. 19, 2021 in the Korean Intellectual Property Office, the contents of which are incorporated herein by reference in their entirety.

TECHNICAL FIELD

The present disclosure relates to a monomer composition for synthesizing recycled plastic that has a low moisture content, increases in particle size, significantly reduces the content of isophthalic acid as an impurity, and thus can secure high-purity terephthalic acid, when recovering terephthalic acid through a depolymerization reaction of a (co)polymer synthesized from a monomer containing terephthalic acid, a method for preparing the same, and a recycled plastic, molded product, and plasticizer composition using the same.

BACKGROUND

Polyethylene terephthalate (PET) is a thermoplastic (co) polymer that has excellent characteristics such as excellent transparency and heat insulation property, and is a plastic widely used in electric wire coverings, daily necessities, toys, electrical insulators, radios, television cases, packaging materials, and the like.

Although polyethylene terephthalate is widely used for various purposes, environmental and health concerns during waste treatment have been continuously raised. Currently, a physical recycling method is being carried out, but in this case, a problem accompanying the deterioration of the quality occurs, and thus, research on the chemical recycling of polyethylene terephthalate are underway.

Terephthalic acid is a useful compound used as a raw material for various kinds of products, which is used as a main raw material for polyethylene terephthalate (PET), polyester fibers, and polyester films for packaging and containers.

Subjecting ethylene glycol together with terephthalic acid to a polycondensation to produce polyethylene terephthalate (PET) is a reversible reaction process, and polyethylene terephthalate (PET) can be depolymerized and recycled to a monomer or oligomer.

Various methods have been conventionally proposed as a method for decomposing polyethylene terephthalate (PET) to recover a monomer as a raw material. Monomers that can be used in the polycondensation reaction for re-producing into a recycled plastic can be obtained through alkali decomposition of polyethylene terephthalate (PET) waste.

For example, polyethylene terephthalate (PET) decomposition products under basic conditions include salts of ethylene glycol and terephthalic acid, and a salt of terephthalic acid is further subjected to a neutralization reaction with a strong acid to prepare terephthalic acid.

However, terephthalic acid obtained by a conventional method usually contains 1 to 2% isophthalic acid as an impurity, and thus, when it is reused as a raw material for producing high value-added plastics such as PBT/TPEE, there is a limit in that problems of deterioration of (co) polymer physical properties (low melting point, low tensile strength, low stiffness, etc.) occur.

Therefore, in the process of decomposing the (co)polymer synthesized from the monomer containing terephthalic acid including polyethylene terephthalate (PET) and recovering the monomer as a raw material, there is a need to develop a method that can significantly reduce the content of isophthalic acid which is an impurity.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

DETAILED DESCRIPTION

Technical Problem

It is an object of the present disclosure to provide a monomer composition for synthesizing recycled plastic that has a low moisture content, increases in particle size, significantly reduces the content of isophthalic acid as an impurity, and thus can secure high-purity terephthalic acid, when recovering terephthalic acid through a depolymerization reaction of a (co)polymer synthesized from a monomer containing terephthalic acid.

It is another object of the present disclosure to provide a method for preparing a monomer composition for synthesizing recycled plastic, and a recycled plastic, molded product, and plasticizer composition using the monomer composition for synthesizing recycled plastic.

Technical Solution

In order to achieve the above object, provided herein is a monomer composition for synthesizing recycled plastic, comprising: terephthalic acid having a particle size of 10 μm or more and 400 μm or less, wherein the monomer composition has a moisture content is 30% or less, and wherein the monomer composition is a recovered product from a (co) polymer synthesized from at least one monomer containing terephthalic acid.

Also provided herein is a method for preparing a monomer composition for synthesizing recycled plastic, comprising the steps of: subjecting a (co)polymer synthesized from at least one monomer containing terephthalic acid to a depolymerization reaction and removing a diol component; washing the depolymerization reaction product from which the diol component has been removed; and cooling the washed depolymerization reaction product to a temperature of 100° C. or less, wherein the washing step comprises: a step of washing the depolymerization reaction product from which the diol component has been removed with a first solvent at a temperature of 20° C. or more and 100° C. or less; and a step of washing the depolymerization reaction product from which the diol component has been removed with a second solvent at a temperature of 200° C. or more and 300° C. or less.

Further provided herein is a recycled plastic comprising a reaction product of the monomer composition and a comonomer.

Further provided herein is a molded product comprising the recycled plastic.

Further provided herein is a plasticizer composition comprising a reaction product of the monomer composition and an alcohol.

Below, a monomer composition for synthesizing recycled plastic, a method for preparing the same, and a recycled plastic, molded product, and plasticizer composition using the same according to specific embodiments of the present disclosure will be described in more detail.

Unless explicitly stated herein, the technical terms used herein are for the purpose of describing specific embodiments only and is not intended to limit the scope of the invention.

The singular forms "a," "an" and "the" used herein are intended to include plural forms, unless the context clearly indicates otherwise.

It should be understood that the terms "comprise," "include", "have", etc. are used herein to specify the presence of stated feature, region, integer, step, action, element and/or component, but do not preclude the presence or addition of one or more other feature, region, integer, step, action, element, component and/or group.

Further, the terms including ordinal numbers such as "a first", "a second", etc. are used only for the purpose of distinguishing one component from another component, and are not limited by the ordinal numbers. For instance, a first component may be referred to as a second component, or similarly, the second component may be referred to as the first component, without departing from the scope of the present disclosure.

In the present specification, the (co)polymer includes both a polymer and a copolymer, the polymer means a homopolymer composed of a single repeating unit, and the copolymer means a composite polymer containing two or more types of repeating units.

1. Monomer Composition for Synthesizing Recycled Plastic

According to one embodiment of the present disclosure, there can be provided a monomer composition for synthesizing recycled plastic, which comprises terephthalic acid, wherein the terephthalic acid has a particle size of 10 μm or more and 400 μm or less, wherein a moisture content is 30% or less, and wherein the monomer composition for synthesizing recycled plastic is recovered from a (co)polymer synthesized from a monomer containing terephthalic acid.

The present inventors has found through experiments that as in the monomer composition for synthesizing recycled plastics of the one embodiment, the particle size of the terephthalic acid recovered from the (co)polymer synthesized from the monomer containing terephthalic acid is sufficiently increased and the viscosity of the composition is lowered, thus increasing the pipe transport efficiency, the process efficiency can be improved by shortening the filter process time, and the drying time can be shortened by decreasing the moisture content, and completed the present disclosure.

Also, the present inventors has found through experiments that, despite that it is recovered from a (co)polymer synthesized from a monomer containing terephthalic acid, as in the monomer composition for synthesizing recycled plastic of the above one embodiment, the ratio of isophthalic acid, which is other monomer and not terephthalic acid, which is the main synthetic target material in the present disclosure, is extremely reduced to less than 0.85 mol % based on 100 mol % of the total monomer compound contained in the monomer composition for synthesizing recycled plastic, thereby capable of realizing excellent physical properties in the synthesis of polyethylene terephthalate or high value-added plastics (PBT, TPEE), and completed the present disclosure.

In particular, terephthalic acid recovered from a (co) polymer synthesized from a monomer containing terephthalic acid obtained by conventional methods usually contains 1 to 2% isophthalic acid as an impurity, whereas according to the present disclosure, isophthalic acid can be almost completely removed by the secondary washing process, which is characteristic in the method for preparing a monomer composition for synthesizing recycled plastics, which will be described later.

Specifically, the monomer composition for synthesizing recycled plastic of the one embodiment may include terephthalic acid. The terephthalic acid is characterized by being recovered from the (co)polymer synthesized from the monomer containing terephthalic acid which is used for the recovery of the monomer composition for synthesizing recycled plastic.

That is, this means that recovery is performed from the (co)polymer synthesized from the monomer containing terephthalic acid in order to obtain the monomer composition for synthesizing recycled plastic of the one embodiment, and as a result, terephthalic acid is also obtained together. Therefore, apart from the recovery from the (co)polymer synthesized from the monomer containing terephthalic acid in order to prepare the monomer composition for synthesizing recycled plastic of the one embodiment, the case where new terephthalic acid is added from the outside is not included in the scope of terephthalic acid of the present disclosure.

Specifically, "recovered from the (co)polymer synthesized from the monomer containing terephthalic acid" means that it is obtained through a depolymerization reaction of the (co)polymer synthesized from the monomer containing terephthalic acid. The depolymerization reaction can be performed under acidic, neutral or basic conditions, and particularly, the depolymerization reaction can proceed under basic (alkaline) conditions.

For example, when the depolymerization reaction proceeds under the basic conditions, terephthalic acid salt called $Na_2$-TPA and ethylene glycol are primarily produced from the polyethylene terephthalate, and $Na_2$-TPA is converted to TPA through a secondary strong acid neutralization, thereby capable of recovering terephthalic acid.

That is, the terephthalic acid recovered from the (co) polymer synthesized from the monomer containing terephthalic acid may include a basic (alkaline) decomposition product of the (co)polymer synthesized from the monomer containing terephthalic acid, an acid-neutralized product thereof, or a mixture thereof. Specifically, the basic (alkaline) decomposition product of the (co)polymer synthesized from the monomer containing terephthalic acid may include $Na_2$-TPA, and the acid-neutralized product of the basic (alkaline) decomposition product of the (co)polymer synthesized from the monomer containing terephthalic acid may include terephthalic acid.

The terephthalic acid may have a molar ratio of more than 99.15 mol %, or 99.5 mol % or more, or 99.9 mol % or more, or more than 99.15 mol % and 100 mol % or less, or 99.5 mol % or more and 100 mol % or less, or 99.9 mol % or more and 100 mol % or less, or 99.99 mol % or more and 100 mol % or less, based on 100 mol % of the total monomer compounds contained in the monomer composition for synthesizing recycled plastic.

Examples of the method for measuring the molar ratio of terephthalic acid are not particularly limited, and, for example, $^1$H NMR, ICP-MS analysis, HPLC analysis, and the like can be used without limitation. As the specific methods, conditions, devices and the like of the NMR, ICP-MS and HPLC, conventionally well-known various contents can be applied without limitation.

In an example of the method for measuring the molar ratio of terephthalic acid, 5 mg or more and 20 mg or less of the monomer composition for synthesizing recycled plastic is collected as a sample under the conditions of normal pressure, 20° C. or more and 30° C. or less, dissolved in 1 ml of DMSO-d6 solvent, and then $^1$H NMR spectrum is obtained via an Agilent DD1 500 MHz NMR instrument, and by using the analysis software (MestReC), the detected peaks of all materials such as terephthalic acid (TPA), isophthalic acid (IPA) and the like are respectively assigned, integrated, and the molar ratio (mol %) of terephthalic acid contained in 100 mol % of the total monomer compounds analyzed in the sample is calculated based on the integral values of the peaks.

As described above, the ratio of terephthalic acid, which is the main synthetic target material in the present disclosure, is extremely increased to more than 99.15 mol % based on 100 mol % of the total monomer compounds contained in the monomer composition for synthesizing recycled plastic, and impurity monomers (e.g., isophthalic acid) rather than terephthalic acid are minimized, thereby capable of realizing excellent physical properties in the synthesis of polyethylene terephthalate or high value-added plastics (PBT, TPEE).

Further, the monomer composition for synthesizing recycled plastic of the one embodiment may further include isophthalic acid having a molar ratio of less than 0.85 mol % based on 100 mol % of the total monomer compounds contained in the monomer composition for synthesizing recycled plastic.

The isophthalic acid is characterized by being recovered from the (co)polymer synthesized from the monomer containing terephthalic acid that is used for the recovery of the monomer composition for synthesizing recycled plastic.

That is, this means that recovery is performed from the (co)polymer synthesized from the monomer containing terephthalic acid in order to obtain the monomer composition for synthesizing recycled plastic of the one embodiment, and as a result, isophthalic acid is also obtained together. Therefore, apart from the recovery from the (co)polymer synthesized from the monomer containing terephthalic acid in order to prepare the monomer composition for synthesizing recycled plastic of the one embodiment, the case where new terephthalic acid is added from the outside is not included in the scope of terephthalic acid of the present disclosure.

Specifically, "recovered from the (co)polymer synthesized from the monomer containing terephthalic acid" means that it is obtained through a depolymerization reaction of the (co)polymer synthesized from the monomer containing terephthalic acid. The depolymerization reaction can be carried out under acidic, neutral or basic conditions, and particularly, the depolymerization reaction can proceed under basic (alkaline) conditions.

The isophthalic acid may have a molar ratio of less than 0.85 mol %, or 0.5 mol % or less, or 0.1 mol % or less, or 0 mol % or more and less than 0.85 mol %, or 0 mol % or more and 0.5 mol % or less, or 0 mol % or more and 0.1 mol % or less, or 0 mol % or more and 0.01 mol % or less, based on 100 mol % of the total monomer compounds contained in the monomer composition for synthesizing recycled plastic.

Examples of the method for measuring the molar ratio of isophthalic acid are not particularly limited, and, for example, 1H NMR, ICP-MS analysis, HPLC analysis, and the like can be used without limitation. As for the specific methods, conditions, devices and the like of the NMR, ICP-MS and HPLC, conventionally well-known various contents can be applied without limitation.

In one example of the method for measuring the molar ratio of terephthalic acid, 5 mg or more and 20 mg or less of the monomer composition for synthesizing recycled plastic is collected as a sample under the conditions of normal pressure, 20° C. or more and 30° C. or less, dissolved in 1 ml DMSO-d6 solvent, and then 1H NMR spectrum is obtained via an Agilent DD1 500 MHz NMR instrument, and by using the analysis software (MestReC), the detected peaks of all materials such as terephthalic acid (TPA), isophthalic acid (IPA) and the like are respectively assigned, integrated, and the molar ratio (mol %) of isophthalic acid contained in 100 mol % of all the monomer compounds analyzed in the sample is calculated based on the integral values of the peaks.

As described above, the ratio of isophthalic acid which is an impurity monomer rather than terephthalic acid which is the main synthetic target material in the present disclosure, is extremely decreased to 0.85 mol % or less based on 100 mol % of the total monomer compounds contained in the monomer composition for synthesizing recycled plastic, thereby capable of realizing excellent physical properties in the synthesis of polyethylene terephthalate or high value-added plastics (PBT, TPEE).

Further, the monomer composition for synthesizing recycled plastic of the one embodiment is characterized by being recovered from a (co)polymer synthesized from a monomer containing terephthalic acid. That is, this means that recovery is performed from the (co)polymer synthesized from the monomer containing terephthalic acid in order to obtain the monomer composition for synthesizing recycled plastic of the one embodiment, and as a result, a monomer composition for synthesizing recycled plastic containing terephthalic acid and isophthalic acid is obtained together.

In the (co)polymer synthesized from the monomer containing terephthalic acid, the (co)polymer includes both a polymer and a copolymer, and collectively refers to a reaction product obtained from the (co)polymerization of monomers. The (co)polymer may include all low molecular weight compounds, oligomers, and polymers depending on the molecular weight range.

The (co)polymer synthesized from the monomer containing terephthalic acid may include at least one (co)polymer selected from the group consisting of polyalkylene terephthalate, polyalkylene terephthalate-based copolymer, and thermoplastic polyester elastomer. That is, the (co)polymer synthesized from the monomer containing terephthalic acid may include one type of polyalkylene terephthalate, one type of polyalkylene terephthalate-based copolymer, one type of thermoplastic polyester elastomer, or a mixture of two or more thereof.

The polyalkylene terephthalate-based copolymer means a copolymer obtained by further reacting an additional comonomer based on alkylene glycol and terephthalic acid which are monomers for synthesizing polyalkylene terephthalate.

The (co)polymer synthesized from the monomer containing terephthalic acid may include a reaction product of terephthalic acid and a comonomer. That is, the monomer containing terephthalic acid may further include a comonomer together with terephthalic acid.

Examples of the comonomer capable of reacting with terephthalic acid are also not particularly limited, and specific examples thereof may include aliphatic diols, polyalkylene oxides, fatty acids, fatty acid derivatives, or combinations thereof.

As the aliphatic diol, for example, a diol having a number average molecular weight (Mn) of 300 g/mol or less, i.e., at least one selected among ethylene glycol, propylene glycol, 1,2-propanediol, 1,3-propanediol, 1,4-butanediol (1,4-BG), 1,5-pentanediol, 1,6-hexanediol, 1,4-cyclohexanedimethanol (1,4-CHDM) can be used. As a specific example, 1,4-butanediol, ethylene glycol, 1,4-cyclohexanedimethanol, or a mixture thereof can be used.

The polyalkylene oxide is a unit constituting a soft fraction, and may include an aliphatic polyether as a constituent component. As an example, at least one selected among polyoxyethylene glycol, polypropylene glycol, poly (tetramethylene ether)glycol (PTMEG), polyoxyhexamethylene glycol, a copolymer of ethylene oxide and propylene oxide, an ethylene oxide addition polymer of polypropylene oxide glycol, and a copolymer of ethylene oxide and tetrahydrofuran can be used, and as a specific example, PTMEG can be used. In particular, PTMEG having a number average molecular weight (Mn) of 600 g/mol to 3,000 g/mol, 1,000 g/mol to 2,500 g/mol, or 1,500 g/mol to 2,200 g/mol can be used.

The fatty acid may be at least one type of aliphatic carboxylic acid compounds excluding terephthalic acid as an example, and adipic acid can be used as a specific example. The fatty acid derivative is a compound derived from the above-mentioned fatty acid, and as an example, at least one selected among fatty acid ester, fatty acid chloride, fatty acid anhydride, and fatty acid amide can be used, and as a specific example, adipic acid ester can be used.

In a more specific example, when 1,4-butanediol which is the aliphatic diol is used as a comonomer capable of reacting with the terephthalic acid, polybutylene terephthalate (PBT), which is a type of polyalkylene terephthalate, can be obtained by polymerization reaction of terephthalic acid and 1,4-butanediol.

Further, when ethylene glycol, which is the aliphatic diol, is used as a comonomer capable of reacting with the terephthalic acid, polyethylene terephthalate (PET), which is a type of the polyalkylene terephthalate, can be obtained through a polymerization reaction of terephthalic acid and ethylene glycol.

Further, when 1,4-butanediol as the aliphatic diol and PTMEG as the polyalkylene oxide are used together as a comonomer capable of reacting with the terephthalic acid, thermoplastic polyester elastomer (TPEE) can be obtained through a polymerization reaction of terephthalic acid, 1,4-butanediol, and PTMEG.

Further, when 1,4-butanediol as the aliphatic diol and adipic acid as the fatty acid are used together as a comonomer capable of reacting with terephthalic acid, polybutylene adipate terephthalate (PBAT), which is a type of the polyalkylene terephthalate-based copolymer, can be obtained through a polymerization reaction of terephthalic acid, 1,4-butanediol, and adipic acid.

Further, when ethylene glycol as the aliphatic diol and 1,4-cyclohexanedimethanol are used together as a comonomer capable of reacting with the terephthalic acid, a glycol-modified PET resin (glycol-modified polyethylene terephthalate, PETG), which is a type of the polyalkylene terephthalate-based copolymer, can be obtained through a polymerization reaction of terephthalic acid, ethylene glycol, and 1,4-cyclohexanedimethanol.

As a specific example, the polyalkylene terephthalate may include at least one (co)polymer selected among polybutylene terephthalate, polyethylene terephthalate, polycyclohexylene dimethylene terephthalate, polyethylene naphthalate, polybutylene naphthalate and polytrimethylene terephthalate.

Further, as a specific example, the polyalkylene terephthalate-based copolymer may include at least one (co) polymer selected among polybutylene adipate terephthalate (PBAT) and glycol-modified PET resin (glycol-modified polyethylene terephthalate, PETG).

Meanwhile, the particle size of the terephthalic acid may be 10 μm or more and 400 μm or less, or 10 μm or more and 300 μm or less, or 20 μm or more and 400 μm or less, or 10 μm or more and 100 μm or less, or 200 μm or more and 400 μm or less. The particle size of the terephthalic acid means the distance between two points where a straight line passing through the center of gravity of a weight of particles meets the boundary line of particles.

Examples of the method for measuring the particle size of the terephthalic acid are not particularly limited, and, for example, FE-SEM images and the like can be used without limitation. As for the specific methods, conditions, equipment and the like of the FE-SEM, conventionally well-known various contents can be applied without limitation. In one example of a method of measuring the particle size of the terephthalic acid, it may be measured through an FE-SEM image with HITACHI-S4800.

As described above, the particle size of terephthalic acid, which is the main synthetic target material in the present disclosure, is increased to 10 μm or more and 400 μm or less, which thus decreases the viscosity of the composition, improves the pipe transport efficiency, shortens the filter process time, improves the process efficiency, minimizes terephthalic acid or an impurity monomer (e.g., isophthalic acid), and increases the recovery efficiency of terephthalic acid, thereby capable of realizing excellent physical properties in the synthesis of polyethylene terephthalate or high value-added plastics (PBT, TPEE).

In particular, in the monomer composition for synthesizing recycled plastic of the one embodiment, the particle size of terephthalic acid being increased from 10 μm or more to 400 μm or less is because, through the step of washing the depolymerization product from which the diol component has been removed; and cooling to a temperature of 100° C. or less, which are performed after the step of subjecting the (co)polymer synthesized from the monomer containing terephthalic acid to a depolymerization reaction and removing the diol component as described later, the solubility of terephthalic acid or its salt is increased, and thus crystals, or impurities such as isophthalic acid interposed between crystals can be dissolved in a solvent to the maximum, and further, since the dissolved terephthalic acid has poor solubility relative to impurities, it can be easily precipitated into terephthalic acid crystals through the difference in solubility when the temperature is lowered subsequently.

In the monomer composition for synthesizing recycled plastic of the one embodiment, when the particle size of terephthalic acid is reduced to less than 10 μm, it is difficult to remove a sufficient level of impurities and secure high purity and high yield of terephthalic acid, so that the recovery process efficiency of terephthalic acid is reduced, and the physical properties of the recovered terephthalic acid and the (co)polymer synthesized therefrom may be deteriorated.

Meanwhile, the moisture content of the monomer composition for synthesizing recycled plastic may be 30% or less, or 25% or less, or 20% or less, or 16% or less, or 15% or less, or 12% or less, or 0.1% or more, or 1% or more, or 0.1% to 30%, or 0.1% to 25%, or 0.1% to 20%, or 0.1% to 16%, or 0.1% to 15%, or 0.1% to 12%, or 1% to 30%, or 1% to 25%, or 1% to 20%, or 1% to 16%, or 1% to 15%, or 1% to 12%.

The moisture content means the content that is calculated as a percentage by dividing the difference between before and after drying by the weight before drying when a sample achieves moisture equilibrium from a low moisture content in a standard state. That is, where a is the weight of the sample in the standard state and b is the weight of the sample after drying, (a−b)÷a×100=moisture content or water content (%).

The method for measuring the moisture content is not particularly limited, and existing methods for measuring the moisture content can be applied without limitation. However, as one example of the method for measuring the moisture content, the weight loss due to the moisture evaporation in the process of drying at 140° C. for 10 minutes using a heat drying type moisture meter (MX-50 available from AND) can be measured in % units.

By extremely reducing the moisture content of the monomer composition for synthesizing recycled plastic to 30% or less, it is possible to shorten the drying time and increase energy efficiency when synthesizing polyethylene terephthalate or high value-added plastics (PBT, TPEE) using the monomer composition for synthesizing recycled plastics.

In the monomer composition for synthesizing recycled plastics of the one embodiment, when the ratio of the organic solvent, which is an impurity monomer other than terephthalic acid, is increased to more than 10 ppm based on 100% by weight of the monomer composition for synthesizing recycled plastic, the physical properties of the recovered terephthalic acid and the (co)polymer synthesized therefrom may be deteriorated due to an excessive amount of the recrystallization organic solvent remaining in the terephthalic acid.

The monomer composition for synthesizing recycled plastic of the one embodiment may further include some small amounts of other additives and solvents, and the types of specific additives and solvents are not particularly limited, and various materials widely used in the terephthalic acid recovery step by depolymerization of a (co)polymer synthesized from a monomer containing terephthalic acid can be applied without limitation.

The monomer composition for synthesizing recycled plastic of the one embodiment can be obtained by a method for preparing a monomer composition for synthesizing recycled plastic, which will be described later. That is, the monomer composition for synthesizing recycled plastics of the one embodiment corresponds to a product obtained through various filtration, purification, washing, and drying steps, in order to secure only terephthalic acid in high purity, which is the main synthetic target material in the present disclosure, after depolymerization of a (co)polymer synthesized from a monomer containing terephthalic acid.

The monomer composition for synthesizing recycled plastics of the one embodiment can be applied as a raw material for the preparation of monomers used in the synthesis of various recycled plastics (e.g., polyethylene terephthalate (PET), polybutylene terephthalate (PBT), polybutylene adipate terephthalate (PBAT), glycol-modified PET resin (glycol-modified polyethylene terephthalate, PETG), thermoplastic polyester elastomer (TPEE)), which will be described later, or can be used as a raw material for the preparation of other additives (e.g., dioctylterephthalate plasticizer) used in the processing of plastics (e.g., polyvinyl chloride (PVC)).

2. Method for Preparing a Monomer Composition for Synthesizing Recycled Plastic

According to another embodiment of the present disclosure, there can be provided a method for preparing a monomer composition for synthesizing recycled plastic, comprising the steps of: subjecting a (co)polymer synthesized from a monomer containing terephthalic acid to a depolymerization reaction and removing a diol component; washing the depolymerization reaction product from which the diol component has been removed; and cooling the result of the washing step to a temperature of 100° C. or less, wherein the washing step comprises a step of washing with a solvent at a temperature of 20° C. or more and 100° C. or less; and a step of washing with a solvent at a temperature of 200° C. or more and 300° C. or less.

The present inventors confirmed through experiments that similarly to the method for preparing the monomer composition for synthesizing recycled plastic of the other embodiments, the ratio of isophthalic acid, which is a monomer other than terephthalic acid, which is the main synthesis target material in the present disclosure is extremely reduced by applying the multi-stage washing process over two times distinguished by the temperature section in the process of recovering terephthalic acid from a (co)polymer synthesized from a monomer containing terephthalic acid, whereby excellent physical properties can be realized in the synthesis of polyethylene terephthalate or high value-added plastics (PBT, TPEE), and completed the present disclosure.

In particular, the terephthalic acid recovered from the (co)polymer synthesized from the monomer containing terephthalic acid obtained by the conventional method usually contains 1 to 2% isophthalic acid as an impurity, whereas according to the present disclosure, isophthalic acid could be almost completely removed by the secondary washing process which is characteristic in the method for preparing the monomer composition for synthesizing recycled plastics, which will be described later.

This is because in the step of washing with a solvent at a temperature of 200° C. or more and 300° C. or less, the solubility of terephthalic acid is increased, and thus, crystals, or impurities such as isophthalic acid and sodium (Na) interposed between crystals can be dissolved and removed with a solvent to the maximum.

Further, the growth of terephthalic acid particles can be induced through the step of cooling to a temperature of 100° C. or less after washing, to thereby produce terephthalic acid having a particle size suitable for the composition viscosity and the filtering process.

Specifically, the method for preparing the monomer composition for synthesizing recycled plastic of the other embodiment may include a step of subjecting the (co)polymer synthesized from the monomer containing terephthalic acid to a depolymerization reaction and removing the diol component.

The (co)polymer synthesized from the monomer containing terephthalic acid can be applied regardless of various forms and types, such as a (co)polymer synthesized from a monomer containing novel terephthalic acid produced through synthesis, a (co)polymer synthesized from a monomer containing recycled terephthalic acid produced through a recycling step; or a (co)polymer waste synthesized from monomers containing terephthalic acid, and the like.

However, if necessary, before proceeding with the depolymerization reaction of the (co)polymer synthesized from the monomer containing terephthalic acid, a pretreatment step of the (co)polymer synthesized from the monomer containing terephthalic acid can be carried out, thereby increasing the efficiency of the step of recovering terephthalic acid from the (co)polymer synthesized from the monomer containing terephthalic acid. Examples of the pretreatment step may include washing, drying, grinding, glycol decomposition, and the like. The specific method of each pretreatment process is not limited, and various methods widely used in the recovery step of terephthalic acid by depolymerization of a (co)polymer synthesized from a monomer containing terephthalic acid can be applied without limitation.

In the depolymerization reaction of the (co)polymer synthesized from the monomer containing terephthalic acid, the depolymerization reaction can be carried out under acidic, neutral, or basic conditions, particularly under basic (alkaline) conditions. More specifically, the depolymerization reaction of the (co)polymer synthesized from the monomer containing terephthalic acid can be carried out in the presence of water, an alkylene glycol, or an alcohol solvent. Specific examples of the alkylene glycol solvent include ethylene glycol, and specific examples of the alcohol solvent include ethanol.

Further, the depolymerization reaction of the (co)polymer synthesized from the monomer containing terephthalic acid can be carried out under basic conditions. The type of the base is not particularly limited, and examples thereof include sodium hydroxide (NaOH).

The depolymerization reaction of the (co)polymer synthesized from the monomer containing terephthalic acid can performed by reacting a base in an amount of 2.3 mol or less, or 1 mol or more and 2.3 mol or less, or 1.5 mol or more and 2.3 mol or less relative to 1 mol of a (co)polymer synthesized from a monomer containing terephthalic acid.

In the depolymerization reaction of the (co)polymer synthesized from the monomer containing terephthalic acid, when the base is reacted in an amount of more than 2.3 mol relative to 1 mol of the (co)polymer synthesized from the monomer containing terephthalic acid, isophthalic acid and sodium (Na), which are impurities other than terephthalic acid, which are the main synthetic target materials, are increased due to the influence of the decrease in the solubility of isophthalate and the increase in the amount of alkaline salt generated, which makes it difficult to sufficiently remove it even by a washing step described later.

Further, the temperature at which the depolymerization reaction of the (co)polymer synthesized from the monomer containing terephthalic acid proceeds is not particularly limited, but for example, the reaction can proceed at a temperature of 25° C. or more and 200° C. or less, or 130° C. or more and 180° C. or less. In addition, the time required for the depolymerization reaction of the (co)polymer synthesized from the monomer containing terephthalic acid may be 0 minutes or more and 3 hours or less.

Meanwhile, after the (co)polymer synthesized from the monomer containing terephthalic acid is subjected to a depolymerization reaction, the diol component can be removed. For example, the polyethylene terephthalate (PET) alkaline decomposition product includes ethylene glycol and terephthalate.

Since the main recovery target material of the present disclosure is terephthalic acid, other by-products can be removed through filtration. The filtered by-products can be recycled without a separation and purification process in the depolymerization reaction of the (co)polymer synthesized from the monomer containing terephthalic acid, or if necessary, can be recycled through separation and purification using conventional distillation, extraction, and adsorption methods.

Moreover, since the main recovery target material of the present disclosure is terephthalic acid, in the case a salt of terephthalic acid, it can be converted to terephthalic acid through a neutralization process with an additional strong acid as described below.

As a specific example, the product of the depolymerization reaction of the (co)polymer synthesized from the monomer containing terephthalic acid is cooled to 50° C. or less, and then ethylene glycol is removed through vacuum filtration to obtain terephthalate.

Meanwhile, the method for preparing the monomer composition for synthesizing recycled plastic of the other embodiment may include a step of washing the depolymerization reaction product from which the diol component has been removed.

As described above, in the depolymerization reaction product from which the diol component has been removed, ethylene glycol is removed, and terephthalic acid obtained by neutralization of terephthalic acid salt can be contained. However, since various impurities remain during the recovery step of obtaining terephthalic acid, washing can be performed in order to sufficiently remove them to secure high-purity terephthalic acid.

Specifically, the washing step may include a step of washing with a solvent at a temperature of 20° C. or more and 100° C. or less, or 20° C. or more and 50° C. or less, or 20° C. or more and 30° C. or less; and a step of washing with a solvent at a temperature of 200° C. or more and 300° C. or less, or 200° C. or more and 250° C. or less, or 200° C. or more and 210° C. or less. The temperature condition means the temperature inside a washing container where washing with a solvent is performed, and various heating devices can be applied without limitation in order to maintain a high temperature out of room temperature.

The difference value between the temperature of the step of washing with a solvent at a temperature of 200° C. or more and 300° C. or less and the temperature of the step of washing with a solvent at a temperature of 20° C. or more and 100° C. or less may be 150° C. or more and 200° C. or less, or 170° C. or more and 200° C. or less.

The difference value between the temperature of the step of washing with a solvent at a temperature of 200° C. or more and 300° C. or less and the temperature of the step of washing with a solvent at a temperature of 20° C. or more and 100° C. or less means a value obtained by subtracting the temperature of the step of washing with a solvent at a temperature of 20° C. or more and 100° C. or less from the temperature of the step of washing with a solvent at a temperature of 200° C. or more and 300° C. or less.

When the difference value between the temperature of the step of washing with a solvent at a temperature of 200° C. or more and 300° C. or less and the temperature of the step of washing with a solvent at a temperature of 20° C. or more and 100° C. or less decreases excessively to less than 150° C., it is difficult to sufficiently remove isophthalic acid and sodium (Na), which are impurities other than terephthalic acid, which is the main synthetic target material.

When the difference value between the temperature of the step of washing with a solvent at a temperature of 200° C. or more and 300° C. or less and the temperature of the step of washing with a solvent at a temperature of 20° C. or more and 100° C. or less increases excessively to more than 200° C., severe conditions are formed to maintain extreme temperature conditions, which can reduce the efficiency of the process.

In the washing step, the step of washing with a solvent at a temperature of 20° C. or more and 100° C. or less may be performed first, and the step of washing with a solvent at a temperature of 200° C. or more and 300° C. or less may be performed later. Alternatively, the step of washing with a solvent at a temperature of 200° C. or more and 300° C. or less may be performed first, and the step of washing with a solvent at a temperature of 20° C. or more and 100° C. or less may be performed later.

More preferably, in the washing step, the step of washing with a solvent at a temperature of 20° C. or more and 100° C. or less may be performed first, and the step of washing with a solvent at a temperature of 200° C. or more and 300° C. or less may be performed later. Thereby, the effect of minimizing the corrosion of the reactor due to strong acid after the neutralization step can be exhibited.

The step of washing with a solvent at a temperature of 20° C. or more and 100° C. or less; and the step of washing with a solvent at a temperature of 200° C. or more and 300° C. or less can be repeated at least once or more, respectively.

Further, if necessary, after proceeding the step of washing with a solvent at a temperature of 20° C. or more and 100° C. or less; or the step of washing with a solvent at a temperature of 200° C. or more and 300° C. or less, a step of removing the residual solvent through filtration may be further performed.

The solvent used in the washing step may include one of water, ethanol, or an aqueous ethanol solution. The aqueous ethanol solution is a mixture of water and ethanol, wherein the weight ratio of ethanol may be 5% by weight or more and 40% by weight or less.

The solvent used in the washing step can be used in a weight ratio of 10 part by weight or more and 50 parts by weight or less based on 1 part by weight of the (co)polymer synthesized from the monomer containing terephthalic acid used in the depolymerization reaction.

More specifically, the solvent in the step of washing with a solvent at a temperature of 20° C. or more and 100° C. or less may be water. Environmental friendliness can be enhanced as the washing proceeds using water without organic solvents. Further, when an organic solvent such as ethanol is used instead of water, the salt (NaCl) cannot be effectively removed, which may cause a problem that the residual amount of sodium (Na) in the composition increases. At this time, the solvent may be used in an amount of 15 parts by weight or more and 25 parts by weight or less based on 1 part by weight of the (co)polymer synthesized from the monomer containing terephthalic acid.

After the step of washing with a solvent at a temperature of 20° C. or more and 100° C. or less, the pH value of the depolymerization product from which the diol component has been removed may be 3 to 4. Thereby, the effect of minimizing the corrosion of the reactor by the strong acid after the neutralization step can be exhibited.

Further, the solvent in the step of washing with a solvent at a temperature of 200° C. or more and 300° C. or less may be water. And, at this time, the solvent may be used in an amount of 5 parts by weight or more and 55 parts by weight or less, or 5 parts by weight or more and 50 parts by weight or less, or 10 parts by weight or more and 50 parts by weight or less, based on 1 part by weight of a (co)polymer synthesized from a monomer containing terephthalic acid. Thereby terephthalic acid is sufficiently dissolved in water, and the solubility of terephthalic acid is increased, and thus, crystals, or impurities such as isophthalic acid interposed between crystals can be dissolved with a solvent to the maximum, and further, since the dissolved terephthalic acid has poor solubility relative to impurities, it can be easily precipitated into terephthalic acid crystals through the difference in solubility when the temperature is lowered subsequently.

Meanwhile, the method for preparing the monomer composition for synthesizing recycled plastics of the other embodiment may include a step of cooling the result of the washing step to a temperature of 100° C. or less. Through a difference in solubility between terephthalic acid and impurities due to the cooling, crystallized terephthalic acid is obtained by filtration or the like, and impurities can be removed in a state of being dissolved in the solvent. The specific cooling conditions are not particularly limited, but for example, cooling can proceed at a temperature of 100° C. or less, or 50° C. or more and 100° C. or less, or 80° C. or more and 100° C. or less. As for the specific cooling device and method used during the cooling, various known cooling techniques can be applied without limitation.

In the step of cooling to a temperature of 100° C. or less, the cooling rate may be 1° C./min to 10° C./min, or 1° C./min to 5° C./min. When the cooling rate is excessively high above 10° C./min, the particle size is not sufficiently increased, the viscosity of the composition increases, making it difficult to transport the pipe, and the efficiency of solid-liquid separation through the filter may be decreased. Meanwhile, when the cooling rate is too slow, i.e., less than 1° C./min, the cooling process may become long, and production efficiency may be reduced.

Meanwhile the method for preparing the monomer composition for synthesizing recycled plastic of the other embodiment may further include a step of subjecting the depolymerization reaction product from which the diol component has been removed to a neutralization reaction with an acid, before the step of washing the depolymerization reaction product from which the diol component has been removed.

For example, polyethylene terephthalate (PET) alkaline decomposition products include ethylene glycol and terephthalate, but since the main recovery target material of the present disclosure is terephthalic acid, in the case of the terephthalate obtained by the alkaline decomposition, it can be converted to terephthalic acid through a further neutralization step with a strong acid. That is, when the depolymerization reaction of the (co)polymer synthesized from the monomer containing terephthalic acid is alkaline decomposition, it can undergo a neutralization reaction step with an acid.

The acid used in the neutralization reaction may be a strong acid, and examples thereof include hydrochloric acid (HCl). Due to the neutralization reaction by the strong acid, the pH may be 4 or less, or 2 or less at the time of completion of the neutralization reaction. The temperature during the neutralization reaction can be adjusted to 25° C. or more and 100° C. or less.

Further, if necessary, after proceeding the step of a neutralization reaction step by acid of the depolymerization reaction product from which the diol component has been removed, a step of removing residual impurities through filtration can be further performed.

Meanwhile, the method for preparing a monomer composition for synthesizing recycled plastic of the other embodiment may further include a step of purifying the depolymerization reaction product from which the diol component has been removed, after the step of subjecting a (co)polymer synthesized from a monomer containing terephthalic acid to a depolymerization reaction and removing a diol component.

Residual impurities can be removed through the purification, and specific purification conditions are not particularly limited. As for specific purification devices and methods, various purification techniques well-known conventionally can be applied without limitation.

In one specific example, the purification step of the depolymerization reaction product from which the diol component has been removed may include a step of dissolving and filtering the depolymerization reaction product from which the diol component has been removed; and an adsorption step through an adsorbent.

In the step of dissolving and filtering the depolymerization reaction product from which the diol component has been removed, water may be used as a solvent for dissolving the depolymerization reaction product from which the diol component has been removed, and the dissolution temperature may be 25° C. or more and 100° C. or less. Thereby, it is possible to remove the (co)polymer synthesized from the monomer containing residual terephthalic acid that did not react in the depolymerization reaction.

In the adsorption step through the adsorbent, activated carbon, charcoal, celite, or a mixture thereof may be used as an example of the adsorbent.

In the purification step of the depolymerization reaction product from which the diol component has been removed, if necessary, an extraction step, a washing step, a precipitation step, a recrystallization step, a drying step, and the like can be further applied without limitation.

Further, as described above, in the case where the depolymerization reaction is an alkaline decomposition, if the purification step of the depolymerization reaction product from which the diol component has been removed is performed, after the purification step of the depolymerization reaction product from which the diol component has been removed, a step of subjecting the depolymerization reaction product from which the diol component has been removed to a neutralization reaction with an acid, and then a step of washing the depolymerization reaction product from which the diol component has been removed can be performed.

On the other hand, the method for preparing the monomer composition for synthesizing recycled plastic of the other embodiment may further include a drying step, after the step of washing the depolymerization reaction product from which the diol component has been removed. The residual solvent can be removed by the drying, and the specific drying conditions are not particularly limited, but for example, the drying can proceed at a temperature of 100° C. or more and 150° C. or less. As for specific drying devices and methods used during the drying, various known drying techniques can be applied without limitation.

3. Recycled Plastic

According to another embodiment of the present disclosure, there can be provided a recycled plastic comprising a reaction product of the monomer composition for synthesizing recycled plastic of the one embodiment and a comonomer. The details of the monomer composition for synthesizing recycled plastic includes all the contents described above in the one embodiment.

Examples corresponding to the recycled plastic are not particularly limited, and various plastics synthesized using terephthalic acid as a monomer can be applied without limitation, and a more specific example may be a (co)polymer synthesized from a monomer containing terephthalic acid.

In the (co)polymer synthesized from the monomer containing terephthalic acid, the (co)polymer includes both a polymer or a copolymer, and collectively refers to a reaction product obtained through (co)polymerization of monomers. The (co)polymer may include all low molecular weight compounds, oligomers, and polymers depending on the molecular weight range.

The (co)polymer synthesized from the monomer containing terephthalic acid may include at least one (co)polymer selected from the group consisting of polyalkylene terephthalate, polyalkylene terephthalate-based copolymer, and thermoplastic polyester elastomer. That is, the (co)polymer synthesized from the monomer containing terephthalic acid may include one type of polyalkylene terephthalate, one type of polyalkylene terephthalate-based copolymer, one type of thermoplastic polyester elastomer, or a mixture of two or more thereof The polyalkylene terephthalate-based copolymer means a copolymer obtained by further reacting an additional comonomer based on alkylene glycol and terephthalic acid which are monomers for synthesizing polyalkylene terephthalate.

Examples of the comonomer capable of reacting with high-purity terephthalic acid contained in the monomer composition for synthesizing recycled plastic of the one embodiment are also not particularly limited, and specific examples thereof include aliphatic diols, polyalkylene oxides, fatty acids, fatty acid derivatives, or combinations thereof.

As the aliphatic diol, for example, a diol having a number average molecular weight (Mn) of 300 g/mol or less, that is, at least one selected among ethylene glycol, propylene glycol, 1,2-propanediol, 1,3-propanediol, 1,4-butanediol (1,4-BG), 1,5-pentanediol, 1,6-hexanediol, and 1,4-cyclohexanedimethanol (1,4-CHDM) can be used, and as a specific example, 1,4-butanediol, ethylene glycol, 1,4-cyclohexanedimethanol, or a mixture thereof can be used.

The polyalkylene oxide is a unit constituting a soft fraction, and may include an aliphatic polyether as a constituent component. As an example, at least one selected among polyoxyethylene glycol, polypropylene glycol, poly(tetramethylene ether)glycol (PTMEG), polyoxyhexamethylene glycol, a copolymer of ethylene oxide and propylene oxide, an ethylene oxide addition polymer of polypropylene oxide glycol, a copolymer of ethylene oxide and tetrahydrofuran can be used, and as a specific example, PTMEG can be used. Particularly, PTMEG having a number average molecular weight (Mn) of 600 g/mol to 3,000 g/mol, 1,000 g/mol to 2,500 g/mol, or 1,500 g/mol to 2,200 g/mol can be used.

The fatty acid may be at least one type of aliphatic carboxylic acid compounds excluding terephthalic acid as an example, and adipic acid can be used as a specific example. The fatty acid derivative is a compound derived from the above-mentioned fatty acid, and as an example, at least one selected among fatty acid ester, fatty acid chloride, fatty acid anhydride, and fatty acid amide can be used, and as a specific example, adipic acid ester can be used.

In a more specific example, when 1,4-butanediol, which is the aliphatic diol, is used as a comonomer capable of reacting with the terephthalic acid, polybutylene terephthalate (PBT), which is a type of polyalkylene terephthalate, can be obtained by polymerization reaction of terephthalic acid and 1,4-butanediol.

Further, when ethylene glycol, which is an aliphatic diol, is used as a comonomer capable of reacting with high-purity terephthalic acid contained in the monomer composition for synthesizing recycled plastic of the one embodiment, polyethylene terephthalate (PET), which is a type of the polyalkylene terephthalate, can be obtained through a polymerization reaction of terephthalic acid and ethylene glycol.

Further, when 1,4-butanediol as the aliphatic diol and PTMEG as the polyalkylene oxide are used together as a comonomer capable of reacting with high-purity terephthalic acid contained in the monomer composition for synthesizing recycled plastic of the one embodiment, a thermoplastic polyester elastomer (TPEE) can be obtained through a polymerization reaction of terephthalic acid, 1,4-butanediol, and PTMEG.

Further, when 1,4-butanediol as the aliphatic diol and adipic acid as the fatty acid are used together as a comonomer capable of reacting with high-purity terephthalic acid contained in the monomer composition for synthesizing recycled plastic of the one embodiment, polybutylene adipate terephthalate (PBAT), which is a type of the polyalkylene terephthalate-based copolymer, may be obtained through a polymerization reaction of terephthalic acid, 1,4-butanediol, and adipic acid.

Further, when the aliphatic diol ethylene glycol and 1,4-cyclohexanedimethanol are used together as a comonomer capable of reacting with terephthalic acid of high purity contained in the monomer composition for synthesizing recycled plastic of the one embodiment, a glycol-modified PET resin (glycol-modified polyethylene terephthalate, PETG), which is a kind of the polyalkylene terephthalate-based copolymer, can be obtained through a polymerization reaction of terephthalic acid, ethylene glycol, and 1,4-cyclohexanedimethanol.

As a specific example, the polyalkylene terephthalate may include at least one (co)polymer selected among polybutylene terephthalate, polyethylene terephthalate, polycyclohexylene dimethylene terephthalate, polyethylene naphthalate, polybutylene naphthalate and polytrimethylene terephthalate.

Further, as a specific example, the polyalkylene terephthalate-based copolymer may include at least one (co)polymer selected from polybutylene adipate terephthalate (PBAT) and glycol-modified PET resin (glycol-modified polyethylene terephthalate, PETG).

Examples of the reaction method of the monomer composition for synthesizing recycled plastic and the comonomer are not particularly limited, and various known methods can be applied without limitation. However, specific examples of the reaction of the monomer composition for synthesizing recycled plastic and the comonomer may include melt-polycondensation and solid-state polymerization.

As a more specific example, when preparing a thermoplastic polyester elastomer (TPEE) from the recycled plastic, aromatic dicarboxylic acid, aliphatic diol and polyalkylene oxide is subjected to an esterification reaction in the presence of a titanium butoxide (TBT) catalyst at 180° C. or more and 250° C. or less for 30 minutes or more and 210 minutes or less to produce BHBT (bis(4-hydroxy)butyl terephthalate) oligomer, and then the TBT catalyst is re-charged, and the melt-polycondensation reaction may be carried out at 200° C. or more and 270° C. or less for 20 minutes or more and 240 minutes or less while gradually reducing the pressure from 760 torr to 0.3 torr. After the completion of the melt-polycondensation reaction, it may be discharged into the reactor under nitrogen pressure to pelletize the strands to form a pellet.

Then, solid-phase polymerization of the pellets in a solid-phase polymerization reactor or a rotatable vacuum dryer in a temperature range of 140° C. or more and 200° C. or less for 10 hours or more and 24 hours or less can be carried out under an inert air flow such as nitrogen under high vacuum.

Further, when producing polyalkylene terephthalate from the recycled plastic, an aromatic dicarboxylic acid and an aliphatic diol having a number average molecular weight (Mn) of 300 g/mol or less may be melt-polymerized and then solid-phase polymerized.

For the polyalkylene terephthalate resin, a low molecular weight pellet obtained by melt polymerization is placed in a solid-phase polymerization reactor, and reacted under high vacuum and inert conditions as presented in the solid-phase polymerization of the thermoplastic polyester elastomer (TPEE) described above, thereby obtaining a high molecular weight resin.

Due to the reaction of the monomer composition for synthesizing recycled plastic and the comonomer, the specific method for preparing the polybutylene terephthalate, polyethylene terephthalate, polycyclohexylene dimethylene terephthalate, polyethylene naphthalate, polybutylene naphthalate, polytrimethylene terephthalate, or polybutylene adipate terephthalate is not particularly limited, and various processes widely known in in the field of the existing recycled plastic synthesis can be applied without limitation.

The physical properties of the recycled plastic may vary depending on the weight ratio of the monomer composition for synthesizing the recycled plastic of the one embodiment and the comonomer, and the weight ratio of the monomer composition for synthesizing recycled plastics and the comonomer of the one embodiment is not particularly limited. In one example, it can be synthesized in a weight ratio of TPA/(TPA+PTMG)=61.5, based on the thermoplastic polyester elastomer (TPEE).

4. Molded Product

According to another embodiment of the present disclosure, a molded article comprising the recycled plastic of the other embodiment can be provided. The details of the recycled plastic includes all the contents described above in the other embodiments. The molded article can be obtained by applying the recycled plastic to various known plastic molding methods without limitation. As an example of the molding method, injection molding, foam injection molding, blow molding, or extrusion molding may be mentioned.

Examples of the molded article are not particularly limited, and can be applied to various molded articles using plastic without limitation. Examples of the molded article include automobiles, electrical and electronic products, communication products, and daily necessities.

5. Plasticizer Composition

According to another embodiment of the present disclosure, there can be provided a plasticizer composition comprising a reaction product of the monomer composition for synthesizing recycled plastic of the one embodiment and an alcohol. The details of the monomer composition for synthesizing the recycled plastic includes all the contents described above in the one embodiment.

Generally, a plasticizer is obtained by appropriately adding a resin such as polyvinyl chloride (PVC) and various additives such as a filler, a stabilizer, a pigment, and an antifogging agent to impart various processed physical properties, and is used as materials for a variety of products, ranging from wires, pipes, flooring, wallpaper, sheets, artificial leather, tarpaulin, tapes, and food packaging materials by processing methods such as extrusion molding, injection molding, and calendaring.

Typically, for the plasticizer, the alcohol reacts with polycarboxylic acid such as phthalic acid and adipic acid to form the corresponding ester. In addition, in consideration of domestic and international regulations on phthalate-based plasticizers that are harmful to the human body, research on plasticizer compositions that can replace phthalate-based plasticizers such as terephthalate-based, trimellitate-based, and other polymer-based plasticizers is being continued.

The reaction product of the monomer composition for synthesizing recycled plastic of the one embodiment and alcohol may include a terephthalate-based compound. Specifically, a terephthalate-based compound can be obtained through a direct esterification reaction between terephthalic acid and alcohol contained in the monomer composition for synthesizing recycled plastic of the one embodiment.

The direct esterification reaction may comprise the steps of adding terephthalic acid to alcohol, then adding a catalyst and reacting the mixture under a nitrogen atmosphere; removing unreacted alcohol and neutralizing unreacted acid; and dehydrating and filtrating the result by distillation under reduced pressure.

Examples of the terephthalate-based compound are not particularly limited, but examples thereof include dioctyl terephthalate (DOTP), diisononyl terephthalate (DINTP), diisodecyl terephthalate (DIDTP), or di(2-propylheptyl)terephthalate (DPHTP) and the like.

The terephthalate-based compound can be prepared through a direct esterification reaction in which any one alcohol selected from the group consisting of octanol, isononyl alcohol, isodecyl alcohol and 2-propylheptyl alcohol, and terephthalic acid are reacted.

The plasticizer composition can be applied to the manufacture of electric wires, flooring materials, automobile interior materials, films, sheets, wallpaper or tubes.

Advantageous Effects

According to the present disclosure, a monomer composition for synthesizing recycled plastic that has a low moisture content, increases in particle size, significantly reduces the content of isophthalic acid as an impurity, and thus can secure high-purity terephthalic acid, when recovering terephthalic acid through a depolymerization reaction of a (co)polymer synthesized from a monomer containing terephthalic acid, a method for preparing the same, and a recycled plastic, molded product, and plasticizer composition using the same can be provided.

DETAILED DESCRIPTION OF THE EMBODIMENTS

Hereinafter, the present disclosure will be explained in detail with reference to the following examples. However, these examples are for illustrative purposes only, and the scope of the present disclosure is not limited thereto.

EXAMPLE

Example 1

(1) Preparation of Recycled Terephthalic Acid Monomer Composition 300 g (1.56 mol) of polyethylene terephthalate (PET) bottle scrap, 1939.69 g (31.25 mol) of ethylene glycol (EG), and 128.13 g (3.20 mol) of sodium hydroxide (NaOH) were placed in a 3 L SUS reactor, and then stirred at 180° C. for 2 hours in a closed system to proceed a PET depolymerization reaction. The product of the depolymerization reaction was cooled to 50° C. or less, and then filtered under vacuum to obtain sodium terephthalate (Na$_2$-TPA).

The filtrate containing sodium terephthalate (Na$_2$-TPA) was completely dissolved in 3000 g of water, and then filtered under vacuum again to remove unreacted PET. Then, 15 g of charcoal was added to the filtrate, stirred for 1 hour, was purified through adsorption, and then filtered to remove charcoal. Then, the result was neutralized using 500~550 ml of 6M HCl at 20~30° C., and the slurry lowered to pH2 or less was filtered under vacuum again to obtain terephthalic acid (TPA).

In order to remove NaCl generated during the neutralization step, a primary washing was performed using 3000 g of water, which is 10 times the mass of PET used, at a temperature of 20-30° C. for 30 minutes or more, and then filtered under vacuum. The filtrate was subjected to a secondary washing with 3000 g of water that is 10 times the mass of PET used, at a temperature of 205° C. for 1 hour, and then slowly cooled at a cooling rate of 1° C./min to recover terephthalic acid (TPA) at 80° C. to 100° C.

Then, drying was performed in a convection oven at 100° C. for 12 hours to recover the recycled terephthalic acid (TPA), thereby preparing a recycled terephthalic acid monomer composition.

(2) Preparation of Recycled Plastic 200 g of the recycled terephthalic acid monomer composition obtained in Example 1(1), 200 g of 1,4-butylene glycol, and 125 g of poly(tetramethylene) glycol (PTMEG) having a number average molecular weight of 1,000~2,000 g/mol was placed in an ester interchange reactor, and then 0.1 wt % of TBT catalyst was added thereto. The mixture was reacted for 120~180 minutes while maintaining 200~240° C., and the reaction was terminated when the reaction rate (the value obtained by converting the amount of water, which is the reaction effluent, into the reaction rate) was 90% or more to obtain an oligomer.

Then, the prepared oligomer was transferred to a polycondensation reactor, and 0.1 wt % of TBT catalyst, 0.14~0.15 wt % of hindered phenolic antioxidant, and 0.15~0.2 wt % of aromatic amine antioxidant or sulfur-based stabilizer were added thereto. The pressure was reduced from 760 torr to 0.3 torr for 30 minutes while maintaining 230~250° C., a melt polycondensation reaction was carried out, and then melt polycondensation was carried out under high vacuum conditions of 0.3 torr or less until the torque applied to the stirrer reached the desired torque. After completion of the reaction, it was discharged using nitrogen pressure, stranded, cooled, and then pelletized to prepare a thermoplastic polyester elastomer (TPEE) resin.

Example 2

A recycled terephthalic acid monomer composition and a recycled plastic were prepared in the same manner as in Example 1, except that in Example 1(1), 6000 g of water, which is 20 times the PET mass, was used during the secondary washing as shown in Table 1 below.

Example 3

A recycled terephthalic acid monomer composition and a recycled plastic were prepared in the same manner as in Example 1, except that in Example 1(1), 15000 g of water, which is 50 times the PET mass, was used during the secondary washing as shown in Table 1 below.

Example 4

A recycled terephthalic acid monomer composition and a recycled plastic were prepared in the same manner as in Example 1, except that after the second washing in Example 1(1), the cooling rate was changed to 5° C./min as shown in Table 1 below.

Example 5

(1) Preparation of Recycled Terephthalic Acid Monomer Composition

A recycled terephthalic acid monomer composition was prepared in the same manner as in Example 1(1).

(2) Preparation of Recycled Plastic 300 g of the recycled terephthalic acid monomer composition obtained in Example 1(1) and 300 g of 1,4-butylene glycol were put into an esterification reactor, and 0.1 wt % of a TBT catalyst was added thereto. The mixture was reacted while maintaining 200-240° C. 120~180 minutes, and the reaction was terminated when the reaction rate (when the amount of water, which is the reaction effluent, converted to the reaction rate) was 90% or more to obtain an oligomer.

Then, the prepared oligomer was transferred to a polycondensation reactor, the pressure was reduced from 760 torr to 0.3 torr for 30 minutes while maintaining 230~260° C., and the melt polycondensation was carried out, and the melt polycondensation reaction was carried out under high vacuum conditions of 0.3 torr or less until the torque applied to the stirrer reached a desired torque value. After completion of the reaction, it was discharged using nitrogen pressure, stranded, cooled and then pelletized to prepare a polybutylene terephthalate (PBT) resin.

COMPARATIVE EXAMPLE

Comparative Example 1

A recycled terephthalic acid monomer composition and a recycled plastic were prepared in the same manner as in Example 1, except that in Example 1(1), the secondary washing temperature was changed to 20-30° C. as shown in Table 1 below.

Comparative Example 2

A recycled terephthalic acid monomer composition and a recycled plastic were prepared in the same manner as in Example 1, except that in Example 1(1), the primary and secondary washing temperature was changed to 80° C. as shown in Table 1 below.

Comparative Example 3

A recycled terephthalic acid monomer composition and a recycled plastic were prepared in the same manner as in Example 1, except that in Example 1(1), 6000 g of water, which is 20 times the mass of PET, was used during the primary and secondary washing as shown in Table 1 below.

Experimental Example 1

The physical properties of the recycled terephthalic acid monomer compositions obtained in Examples and Comparative Examples were measured by the following methods, and the results are shown in Table 1 below.

1. Content of Terephthalic Acid (TPA) and Isophthalic Acid (IPA)

5~20 mg of recycled terephthalic acid monomer composition was collected as a sample under the conditions of normal pressure and 20-30° C., dissolved in 1 ml DMSO-d6 solvent, and then 1H NMR spectrum was obtained through an Agilent DD1 500 MHz NMR instrument. All material peaks detected, such as terephthalic acid (TPA) and isophthalic acid (IPA), were respectively assigned and integrated using an analysis software (MestReC). The molar ratio (mol %) of terephthalic acid and isophthalic acid contained in 100 mol % of all monomer compounds analyzed in the sample was calculated based on the peak integral value.

2. Particle Size of Terephthalic Acid (TPA)

The maximum diameter and the minimum diameter of the terephthalic acid (TPA) particles contained in the recycled terephthalic acid monomer composition obtained in Examples and Comparative Examples were respectively measured through FE-SEM images with HITACHI-S4800.

3. Moisture Content

For the recycled terephthalic acid monomer composition obtained in Examples and Comparative Examples, the weight loss due to moisture evaporation was measured in units of % in the process of drying at 140° C. for 10 minutes using a heat drying type moisture meter (MX-50 available from AND)

TABLE 1

| | | Measurement result of Experimental Example | | | | | | |
|---|---|---|---|---|---|---|---|---|
| Category | Depolymerization solvent | Primary washing condition | Secondary washing condition | Cooling rate | TPA (mol %) | IPA (mol %) | Particle Size (μm) | Moisture content (%) |
| Example 1 | Ethylene glycol | 20~30° C./ water (10 times the PET mass) | 205° C./ water (10 times the PET mass) | 1° C./min | 100 | 0 | 30~40 | 16 |
| Example 2 | Ethylene glycol | 20~30° C./ water (10 times the PET mass) | 205° C./ water (20 times the PET mass) | 1° C./min | 100 | 0 | 40~60 | 15 |

TABLE 1-continued

| | | | Measurement result of Experimental Example | | | | | |
|---|---|---|---|---|---|---|---|---|
| Category | Depolymerization solvent | Primary washing condition | Secondary washing condition | Cooling rate | TPA (mol %) | IPA (mol %) | Particle Size (μm) | Moisture content (%) |
| Example 3 | Ethylene glycol | 20~30° C. water (10 times the PET mass) | 205° C./ water (50 times the PET mass) | 1° C./min | 100 | 0 | 200~400 | 12 |
| Example 4 | Ethylene glycol | 20~30° C. water (10 times the PET mass) | 205° C./ water (10 times the PET mass) | 5° C./min | 100 | 0 | 20~30 | 20 |
| Comparative Example 1 | Ethylene glycol | 20~30° C./ water (10 times the PET mass) | 20~30° C./ water (10 times the PET mass) | 1° C./min | 98.8 | 1.2 | 1 or less | 56 |
| Comparative Example 2 | Ethylene glycol | 80° C./ water (10 times the PET mass) | 80° C./ water (10 times the PET mass) | 1° C./min | 99.1 | 0.9 | 1 or less | 54 |
| Comparative Example 3 | Ethylene glycol | 20~30° C./ water (20 times the PET mass) | 20~30° C./ water (20 times the PET mass) | 1° C./min | 98.9 | 1.1 | 1 or less | 57 |

As shown in Table 1, among the monomers contained in the recycled terephthalic acid monomer composition obtained in Examples 1 to 4, terephthalic acid was contained in an amount of 100 mol %, so that isophthalic acid, which is an impurity, was completely removed, thereby exhibiting high-purity terephthalic acid purification efficiency. On the other hand, among the monomers contained in the recycled terephthalic acid monomer composition obtained in Comparative Examples, isophthalic acid, which is an impurity, was contained in an amount of 0.9 mol % to 1.2 mol %, and was contained in an excessive amount relative to Examples, thereby greatly reducing terephthalic acid purification efficiency.

On the other hand, it could be confirmed that the particle size of terephthalic acid contained in the recycled terephthalic acid monomer composition obtained in Examples was 20 μm to 400 μm, which was increased compared to Comparative Examples whose particle size is less than 1 μm.

In addition, it could be confirmed that the moisture content of the recycled terephthalic acid monomer composition obtained in Examples was 12% to 20%, which was reduced from that of Comparative Examples whose moisture content is 54% to 57%.

The invention claimed is:

1. A monomer composition for synthesizing recycled plastic, comprising:
   terephthalic acid having a particle size of 10 μm or more and 400 μm or less,
   wherein the monomer composition has a moisture content is 30% or less,
   wherein the monomer composition is a recovered product from a (co)polymer synthesized from at least one monomer containing terephthalic acid, and wherein the moisture content is calculated by the following Equation:

$$(a-b) \div a \times 100 \qquad \text{[Equation]}$$

in the above equation,
'a' is the weight of the monomer composition before drying at 140° C. for 10 minutes,
'b' is the weight of the monomer composition after drying at 140° C. for 10 minutes.

2. The monomer composition according to claim 1, further comprising an isophthalic acid having a molar ratio of less than 0.85 mol % based on 100 mol % of a total monomer compounds contained in the monomer composition.

3. The monomer composition according to claim 1, wherein the at least one monomer containing terephthalic acid further comprises aliphatic diols, polyalkylene oxides, fatty acids, fatty acid derivatives, or a combination thereof.

4. The monomer composition according to claim 1, wherein the terephthalic acid has a molar ratio of more than 99.15 mol % based on 100 mol % of a total monomer compounds contained in the monomer composition.

5. The monomer composition according to claim 2, wherein the isophthalic acid is recovered from the (co) polymer.

6. The monomer composition according to claim 1, wherein
   the (co)polymer comprises at least one (co)polymer selected from the group consisting of polyalkylene terephthalate, polyalkylene terephthalate-based copolymer, and thermoplastic polyester elastomer.

7. A method for preparing a monomer composition for synthesizing recycled plastic, comprising the steps of:

subjecting a (co)polymer synthesized from at least one monomer containing terephthalic acid to a depolymerization reaction and removing a diol component;

washing a depolymerization reaction product from which the diol component has been removed; and cooling the washed depolymerization reaction product to a temperature of 100° C. or less, wherein the washing step comprises:

a step of washing the depolymerization reaction product from which the diol component has been removed with a first solvent at a temperature of 20° C. or more and 100° C. or less; and a step of washing the depolymerization reaction product from which the diol component has been removed with a second solvent at a temperature of 200° C. or more and 300° C. or less.

8. The method for preparing a monomer composition according to claim 7, wherein each of the first solvent and the second solvent is water.

9. The method for preparing a monomer composition according to claim 7, whereinafter the step of washing with the first solvent at a temperature of 20° C. or more and 100° C. or less, the depolymerization reaction product from which the diol component has been removed has a pH value of 3 to 4.

10. The method for preparing a monomer composition according to claim 7, wherein in the step of washing with the second solvent at a temperature of 200° C. or more and 300° C. or less, the second solvent is used in an amount of 5 parts by weight or more and 55 parts by weight or less based on 1 part by weight of the (co)polymer.

11. The method for preparing a monomer composition according to claim 7, wherein the washing step proceeds the step of washing with the second solvent at a temperature of 200° C. or more and 300° C. or less, after the step of washing with the first solvent at a temperature of 20° C. or more and 100° C. or less.

12. The method for preparing a monomer composition according to claim 7, wherein a difference value between the temperature of the step of washing with the second solvent at a temperature of 200° C. or more and 300° C. or less and the temperature of the step of washing with the first solvent at a temperature of 20° C. or more and 100° C. or less is 150° C. or more and 200° C. or less.

13. The method for preparing a monomer composition according to claim 7, wherein in the cooling step, the cooling rate is from 1° C./min to 10° C./min.

14. The method for preparing a monomer composition according to claim 7, wherein the depolymerization reaction of the (co)polymer is carried out by reacting a base and the (co)polymer with a molar ratio of the base in an amount of 2.3 moles or less relative to 1 mole of the (co)polymer.

15. The method for preparing a monomer composition according to claim 7, wherein the depolymerization reaction of the (co)polymer synthesized from the at least one monomer containing terephthalic acid is carried out in the presence of water or alkylene glycol solvent.

16. The method for preparing a monomer composition according to claim 7, wherein before the step of washing the depolymerization reaction product from which the diol component has been removed, the method further comprises neutralizing the depolymerization reaction product from which the diol component has been removed with an acid.

17. A recycled plastic, comprising:

a reaction product of the monomer composition of claim 1 and a comonomer.

18. A molded product, comprising:

the recycled plastic of claim 17.

19. A plasticizer composition, comprising:

a reaction product of the monomer composition of claim 1 and an alcohol.

*  *  *  *  *